US005705136A

United States Patent [19]
Drago et al.

[11] Patent Number: 5,705,136
[45] Date of Patent: Jan. 6, 1998

[54] CATALYZED DECOMPOSITION OF NITROGEN OXIDES ON METAL OXIDE SUPPORTS

[75] Inventors: Russell S. Drago; Krzysztof Jurczyk, both of Gainesville, Fla.

[73] Assignee: University of Florida Research Foundation, Inc., Gainesville, Fla.

[21] Appl. No.: 555,646

[22] Filed: Nov. 13, 1995

[51] Int. Cl.$^6$ ................................................. C01B 21/00
[52] U.S. Cl. ...................... 423/239.1; 502/324; 502/325; 502/329; 502/331; 502/343; 502/345
[58] Field of Search .................................. 423/351, 579, 423/239.1; 502/325, 324, 331, 329, 345, 343

[56] References Cited

U.S. PATENT DOCUMENTS

| | | | |
|---|---|---|---|
| 5,128,305 | 7/1992 | Hoshimoto et al. | 502/243 |
| 5,171,553 | 12/1992 | Li et al. | 423/239 |
| 5,200,162 | 4/1993 | Riley et al. | 423/239 |
| 5,219,545 | 6/1993 | Kagawa et al. | 423/239 |
| 5,238,890 | 8/1993 | Hayasaka et al. | 302/61 |
| 5,270,024 | 12/1993 | Kasahara et al. | 423/213.2 |
| 5,314,673 | 5/1994 | Anseth et al. | 423/239.1 |
| 5,407,652 | 4/1995 | Swamy et al. | 423/239.1 |
| 5,433,933 | 7/1995 | Eshita et al. | 423/213.2 |

FOREIGN PATENT DOCUMENTS

| | | | |
|---|---|---|---|
| 5-103953 | 4/1993 | Japan | 53/36 |

OTHER PUBLICATIONS

Cimino, A. et al., "Activity of Cobalt Ions Dispersed in Magnesium Oxide for the Decomposition of Nitrous Oxide", *Journal of Catalysis*, 25:362–377 (1972).

Kannan et al., "Catalytic decomposition of nitrous oxide on in situ generated thermally calcined hydrotalcites," *Applied Catalysis B:Environmental*, 3:109–116 (1994).

Nakamura et al., "Oxygen Species Formed on Different Surface Sites of CaO by Decomposition of $N_2O$ and the Reactivity," *Journal of Catalysis*, 138:686–693 (1992).

Pepe, Franco, "The Catalytic Activity of Cobalt(III) Ions Dispersed in Magnesium Oxide on the $N_2O$ Decomposition," *Gazzetta Chimica Italiana*, 103:1201–1211 (1973).

Sobolev et al., "Catalytic Properties of AXM-5 Zeolites in $N_2O$ Decomposition: The Role of Iron," *Journal of Catalysis*, 139:435–443 (1993).

Swamy et al., "Decomposition of $N_2O$ on Perovskite-Related Oxides," *Catal.Rev.–Sci.Eng.*, 34:(4):409–425 (1992).

*Primary Examiner*—Deborah Jones
*Attorney, Agent, or Firm*—Arnold, White & Durkee

[57] ABSTRACT

This invention is a nitrogen oxide decomposition process and catalyst employed therein. The catalyst is a metal oxide, such as CoO, on a basic metal oxide-containing support, such as a MgO support.

26 Claims, No Drawings

CATALYZED DECOMPOSITION OF NITROGEN OXIDES ON METAL OXIDE SUPPORTS

BACKGROUND OF THE INVENTION

The invention relates to a process for decomposition of nitrogen oxides, particularly nitrogen (I) oxide (nitrous oxide) using a mixed metal oxide catalyst.

The catalytic decomposition of nitrous oxide, $N_2O$, has taken on renewed interest with the recognition of the deleterious effect of this material on the ozone layer. (Thiemens and Trogler, *Science*, 251:932, 1991; Armor, *Appl. Catal.*, B1:139, 1992.) Massive amounts of nitrous oxide are produced in industrial processes (Armor, *Appl. Catal.*, B1:139, 1992) with about $1.5 \times 10^9$ lbs./yr. or 10% of the annual $N_2O$ increase resulting from adipic acid production. Doped alkaline earth oxides, (see, for example, Cimino and Pepe, *J. Catal.*, 25:362, 1972; Indovina, et al., *J. Chem. Soc., Faraday Trans 1*, 75:2177, 1975; Angeletti, et al., *J. Chem. Soc. Faraday Trans 1*, 77:641, 1981; Angeletti, et al., *J. Chem. Soc. Faraday Trans 1*, 74(7):1595, 1978), doped $Al_2O_3$ (Pomonis, *J. Chem. Soc. Faraday Trans 1.*, 81:2043, 1985), zeolites (Li and Armor, *Appl. Catal.*, B1:21, 1992) and perovskites (Swamy and Christopher, *Catal. Rev. Sci. Eng.*, 34(4):409, 1992) have been reported to decompose $N_2O$ to $N_2$ and $O_2$. The alkaline earth and $Al_2O_3$ reports describe kinetic measurements of the heterogenous decomposition reaction to determine the mechanism of the catalytic reaction, and typically, the extent of reaction was less than 2 % or less than one turnover was achieved. The reports using zeolites and perovskites describe catalytic systems of marginal activity and stability.

Kinetic studies of the decomposition of $N_2O$ on CoO/MgO were reported in the 1960's and 1970's by Cimino and coworkers (Cimino and Pepe, *J. Catal.*, 25:362, 1972). Conversions of 1% were reported. Activation energies were found to decrease from 29 kcal mole$^{-1}$ on pure CoO to 17 kcal mole$^{-1}$ on 0.05 atomic percent solid solutions of CoO on MgO. The catalyst was prepared by impregnating magnesium oxide with a solution of cobalt nitrate, and drying and calcining the catalyst at temperatures of 1000° C. or above for 5 hours. The activity of the catalyst is reported to decrease with increasing cobalt concentration.

More recently, complete decomposition of $N_2O$ on hydrotalcites was studied in a circulating reactor employing two minute reaction times. (Karman and Swamy, *Appl. Catal. B. Env.*, p. 109, 1994). These studies have provided insight regarding the mechanism of $N_2O$ decomposition, but have not addressed the use of catalysts for decomposing nitrogen oxides under conditions similar to those found in continuously flowing industrial feed streams.

SUMMARY OF THE INVENTION

The present invention provides a solution to one or more of the disadvantages described above or otherwise known to one skilled in the art.

In one broad respect, this invention is a process for the decomposition of nitrogen oxides, comprising contacting a nitrogen oxide with a mixed oxide catalyst under conditions effective to decompose the nitrogen oxide to nitrogen and oxygen, wherein the catalyst comprises a first metal oxide on a basic metal oxide support containing a metal oxide selected from MgO, CaO, ZnO, $TiO_2$, $MoO_3$—CoO—$Al_2O_3$, ZnO—$Al_2O_3$, $TiO_2$—MgO, $Al_2O_3$—ZnO, $TiO_2$—$Al_2O_3$, $TiO_2$—ZnO, MgO—CuO and MgO—NiO or mixtures thereof, and wherein the catalyst is prepared by contacting the support with a first metal nitrate salt, wherein the first metal is Mn, Fe, Co, Ni, Cu, Zn, or mixture thereof, and wherein the catalyst is calcined prior to use under conditions effective to decompose the first metal nitrate or hydroxides to the first metal oxide without sintering or intercalation of the catalyst.

In another respect, this invention is a mixed oxide catalyst composition useful in a process for the decomposition of nitrogen oxides, wherein the composition comprises a first metal oxide on a basic metal oxide support containing a metal oxide selected from MgO, CaO, ZnO, $TiO_2$, $MoO_3$—CoO—$Al_2O_3$, ZnO—$Al_2O_3$, $TiO_2$—MgO, $Al_2O_3$—ZnO, $TiO_2$—$Al_2O_3$, $TiO_2$—ZnO, MgO—CuO and MgO—NiO or mixtures thereof, and wherein the catalyst is prepared by contacting the support with a first metal nitrate salt, wherein the first metal is Mn, Fe, Co, Ni, Cu, Zn, or mixture thereof, and wherein the catalyst is calcined prior to use under conditions effective to decompose the first metal nitrate or hydroxides to the first metal oxide without sintering or intercalation of the catalyst.

In another respect, this invention is a process for the decomposition of nitrogen oxides, comprising contacting a gaseous feed containing one or more nitrogen oxides with a mixed oxide catalyst under conditions effective to decompose nitrogen oxide components to nitrogen and oxygen, wherein the catalyst is prepared by adding a base to an aqueous composition containing a first metal nitrate, at least one basic metal nitrate, and aluminum nitrate such that a gel forms; drying the gel; and calcining the dry gel to form the mixed metal oxide; wherein the first metal is Mn, Fe, Co, Ni, Cu or Zn.

In accordance with this invention, it has been found that a practical $N_2O$ decomposition catalyst will require dispersed transition metal ions that do not sinter or intercalate with the matrix at the temperatures necessary to obtain a fast rate for $O_2$ evolution from the solid. Sintering occurs when a catalyst is heated to a temperature below the melting point that is high enough to cause agglomeration of the catalyst material and a loss of catalytic surface area. Intercalation occurs when a catalyst is heated to the point where the first metal oxide is incorporated into the matrix of the catalyst support by reaction or exchange of electrons. It is undesirable when the extent of catalyst sintering or intercalation becomes sufficient enough to substantially reduce the catalytic activity.

Advantageously, the catalysts of this invention decompose nitrous oxide to molecular nitrogen and oxygen at relatively high feed stream flow rates without significant catalyst decomposition under conditions effective for decomposition. Moreover, the method of preparation of the alkaline earth oxide supported catalysts of the present invention possess surprisingly high catalytic activity and unexpectedly long lifetimes. Further, the hydrotalcite-like supported catalysts of the present invention offer superior activity at temperatures above 500° C. and longer life than previous hydrotalcite compositions. Also, the hydrotalcite-like supported catalysts of the present invention are advantageously produced at a lower cost than those previously reported. This lower catalyst cost is due to the relatively small amount of cobalt typically employed in the hydrotalcite-like compositions of the present invention.

DETAILED DESCRIPTION OF THE INVENTION

As used herein, "GHSV" means gas hourly space velocity. As used herein, "lifetime" means the cumulative time in a single run for which the initial catalyst activity decreases no more than 50%.

In the practice of this invention, a nitrogen oxide is contacted with a catalyst of this invention. The nitrogen oxide may be present alone or within an admixture with other gaseous components in a feed. Various forms of nitrogen oxide may be present in the practice of this invention, including $N_2O$, $NO$, $N_2O_3$, $NO_2$, $N_2O_4$, $N_2O_5$, $NO_3$, $N_2O_6$ and mixtures thereof. When the feed contains other components, the components may be the nitrogen oxides described above, $N_2$, $O_2$ or inert gases such as Ar or He. A feed may have, for example, a concentration of nitrous oxide which may vary from below 1 to about 75 volume % and the balance helium, or 2 to 5% $O_2$ in helium as a carrier gas. This invention may thus be used to treat stack gases. Generally, flow rates in this invention may vary from about 1000 to about 100,000 $hr^{-1}$. In the practice of the nitrogen oxide decomposition, process temperatures may vary from about 400° C. to typically less than 850° C., preferably in the range from about 500° C. to about 700° C.

The catalysts suitable for use in this invention include oxides such as MnO, CuO, NiO or CoO on a support containing a basic metal oxide such as MgO, CaO, ZnO, $TiO_2$, $MoO_3$—CoO—$Al_2O_3$, ZnO—$Al_2O_3$, $TiO_2$—MgO, $Al_2O_3$—ZnO, $TiO_2$—$Al_2O_3$, $TiO_2$—ZnO, MgO—CuO, MgO—NiO or mixtures thereof. The mixed oxide catalysts also include catalysts of the form CoO/xMgO, wherein x is 1, 2, 5 or 10, as well as catalysts of the form CuO/2MgO, 3NiO/5MgO, MnO/2MgO, CoO/2CaO, or 2MgO/CuO. Preferred compositions include those containing CoO and MgO, as they are generally more effective at achieving high percentage decomposition of nitrogen oxides than those catalysts supported on CaO or those using oxides other than CoO on MgO-containing supports.

The basic mixed metal oxide catalysts of the present invention may be prepared by combining an aqueous solution of first metal salt with an aqueous solution of a basic metal salt, wherein the hydroxides are precipitated using a base such as $NH_4OH$ or NaOH, and are washed with water so as to remove the soluble sodium or ammonium salt formed in the precipitation reaction, and wherein the precipitate is recovered and dried overnight under vacuum. To form the final catalyst, the dried precipitate is then calcined at a temperature high enough to decompose the metal nitrates to oxides, but below the temperature where sintering or intercalation occurs. Alternatively, the catalyst is prepared by impregnating a basic metal oxide support to incipient wetness using an aqueous first metal nitrate composition, drying the resulting impregnated support, and calcining at a suitable temperature to form the metal oxide supported catalyst.

As an example, one manner of obtaining a mixed oxide catalyst with a desired ratio of first metal oxide to MgO or CaO, is as follows. An aqueous solution is prepared containing a mixture of the nitrate salts of the selected first metal and the nitrate salts of Mg or Ca in the same molar proportion as desired for the catalyst. The hydroxides of the metal nitrates are then precipitated by adding a 20% solution of $NH_4OH$ to the mixture until the pH of the solution is from about 7 to about 12. The coprecipitated hydroxides are then washed with distilled water to remove the $Na^+$ or $NH_4+$ and $NO_3-$ constituents, dried under a vacuum at around 100° C. overnight, crushed and then calcined for a time period of from about 6 to 12 hours in He, $N_2$, Ar, air or other suitable gas at a temperature high enough to decompose the metal nitrates to metal oxides, but below the temperature where sintering or intercalation occurs, preferably from about 500° C. to about 800° C. As an alternative, the hydroxides of the metal nitrates can be precipitated by adding the aqueous mixture of metal nitrate salts to an aqueous solution containing a NaOH concentration equivalent to around twice the combined molarity of the aqueous mixture of the metal nitrate salts. The solution of metal nitrates is added to the NaOH solution in a dropwise fashion while stirring so that the pH of the solution is about 10. $HNO_3$ is then added to the solution to reduce the pH to about 9. The gelatinous mixture which results is then heated to 80°–85° C. for about 15 hrs., cooled, filtered, washed repeatedly with distilled water and dried overnight under vacuum at 70° C. Finally, the mixture is crushed and then calcined for around 6–12 hours in He, $N_2$, Ar, air or other suitable gas at a temperature high enough to decompose the metal nitrates to metal oxides, but below the temperature where sintering or intercalation occurs, preferably from about 500° C. to about 800° C.

As a further alternative, a mixed oxide catalyst may be obtained without co-precipitation of the metal oxides. In this case, the mixed oxide catalysts may be prepared from pre-existing base metal oxide support structures. In one possible embodiment, the mixed oxide catalyst may be prepared from commercial base metal oxide support pellets by crushing the support pellets to a powder, adding a desired concentration of a first metal nitrate solution to the crushed support to incipient wetness, drying the sample in a vacuum at about 180° C. overnight, and calcining the sample for around 6–12 hours at a temperature high enough to decompose the metal nitrates to metal oxides, but below the temperature where sintering or intercalation occurs, preferably from about 500° C. to about 800° C.

Basic metal-supported mixed oxide catalysts prepared according to the method of the present invention may yield nitrogen oxide decomposition rates of up to 100% and may maintain their activity for at least about 200 hours. These catalysts have been shown to be successful at decomposing greater than 95% of the nitrous oxides in feed streams containing from 100,000 up to 380,000 ppm nitrogen oxide. At flow rates above 10,000 $h^{-1}$, the catalysts of this invention have also proven superior to metal oxide catalysts supported on silica, the catalyst of this invention achieving 99% or greater conversion of nitrous oxides at GHSV flow rates ranging from about 5000 $hr^{-1}$ up to about 45,000 $hr^{-1}$. The superior nitrogen oxide conversion characteristics of the basic metal mixed oxide catalysts of the present invention are apparently due to the relatively low temperature exposure of the calcination step, which occurs preferably at a temperature of from about 500° C. to about 800° C. for around 6–12 hours, but which could also occur at higher temperatures for shorter time periods or at lower temperatures for longer time periods. Generally, it has been found that calcination temperatures of around 1000° C. for time periods of 8–12 hours result in degradation of the catalyst activity. Calcination temperatures below about 300° C. generally do not covert the nitrate to oxides, and temperatures from about 300° C. to about 400° C. may require relatively long calcination time periods.

To determine possible reasons behind the superior conversion characteristics of the basic metal oxide catalysts of the present invention, x-ray photoelectric spectroscopy (XPS) was performed on different preparations of the CoO/MgO catalyst. Two catalysts were prepared similarly, but one catalyst was calcined at about 1000° C. and the other at about 500° C. Distinct differences in the XPS spectra of these two particular catalyst preparations were detected, primarily in the oxygen peaks. In the 1000° C. calcined sample only one oxygen 1s peak was observed, which was centered at about 530.3 ev. This is consistent with oxygen in the −2 oxidation state. However, in the 500° C. calcined sample the oxygen 1s peak could be resolved into 3 different components. The three peaks were at about 527.6 ev, about 530.8 ev, and about 532.8 ev. These new components arise partially due to the presence of hydroxyl functionality which is present on the catalyst. Also, the formation of a spinnel or related structure could account for the loss of the three different 1s oxygen peaks into one peak when the sample is heated to about 1000° C. Less difference was detected in the metal peaks of the XPS spectra. The cobalt $2p_{3/2}$ and $2p_{1/2}$ peaks and the satellites associated with these peaks are located in the same position for both preparations. The $2p3/2$ is at 781.1 ev and its satellite at 786.4 ev. This is a separation of 5.3 ev which is consistent for cobalt in a tetrahedral coordination. The $2p_{1/2}$ peak of cobalt is at 797.3 ev and its satellite at 803.4 ev. This separation is consistent for cobalt in the octahedral and/or tetrahedral position. The separation of the $2p_{3/2}$ and $2p_{1/2}$ peaks is 15.9 ev. This is consistent with cobalt in the +2 or +3 oxidation state. The relative intensities of the principle peaks to their satellites is similar in both preparations with the 1000° C. preparation ratio being slightly higher. Finally, the magnesium 2p is similar in both preparations.

The hydrotalcite-like catalysts of the present invention preferably include those represented by the formula $C_xMg_yAl_2(OH)_{20}CO_3 \cdot yH_2O$ wherein x=3, y=5 or alternatively x=4, y=4. Also included in this invention are other hydrotalcite-like materials selected from the group $Cu_3Mg_5Al_2(OH)_{20}CO_3 \cdot yH_2O$; $Ni_3Mg_5Al_2(OH)_{20}CO_3 \cdot yH_2O$; $Mn_3Mg_5Al_2(OH)_{20}CO_3 \cdot yH_2O$; or $Co_3Ca_5Al_2(OH)_{20}CO_3 \cdot yH_2O$.

The hydrotalcite-like catalysts of this invention are prepared by mixing an aqueous base solution, such as one containing $Na_2CO_3$ and NaOH, with an aqueous solution of aluminum nitrate mixed with selected nitrates of Co, Mg, Cu, Ni, Mn or Ca to form a gelatinous material. The mixture is then filtered, washed and dried under vacuum. The mixture is then calcined at minimum temperatures and times necessary to decompose the nitrates to oxides, but at maximum temperature and times where sintering does not occur. For example, one manner of obtaining a hydrotalcite-like catalyst having a desired molar ratio of metal elements is as follows. An aqueous solution containing a mixture of the nitrate salts of the selected metals and containing aluminum nitrate in the same molar proportions as desired for the catalyst is prepared. A second aqueous solution is prepared containing a molar amount of $Na_2CO_3$ equivalent to the molar amount of aluminum nitrate present in the first solution and also containing a molar amount of NaOH equivalent to the total molar concentration of the metal nitrates present in the first solution. The first solution is then added dropwise to the second solution over a period of 1 hour while stirring so that a gelatinous solution having a pH of approximately 8.2–8.5 is obtained. This gelatinous mixture is then heated for about 15 hours at a temperature of 80°–85° C., filtered, washed repeatedly with deionized water and dried overnight under a vacuum at about 70° C. The remaining solid is then crushed and calcined in He, $N_2$, Ar, air or other suitable gas preferably at a temperature of from about 500° C. to about 800° C., for a time period of from about 8 to about 12 hours.

Hydrotalcite-like catalysts prepared according to the method of the present invention may yield nitrogen oxide decomposition rates of up to 100% and may maintain their activity for at least 120 hours in feed streams containing around 250,000 ppm nitrous oxide and at least 100 hours in feed streams containing around 350,000 ppm nitrous oxide. The alkaline earth containing hydrotalcite-like catalysts of the present invention have been shown to be successful at decomposing greater than 95% of the nitrogen oxide in feed streams containing from 100,000 up to 350,000 ppm nitrous oxide. These catalysts have also been shown to achieve 90% or greater conversion of nitrous oxide at GHSV flow rates ranging from about 5000 $hr^{-1}$ up to about 15,000 $hr^{-1}$. The superior nitrogen oxide conversion characteristics of these catalysts are due to the relatively low temperature exposure of the calcination step, which preferably occurs at a temperature of from about 500° C. to about 800° C., for time periods of from about 8 to about 12 hours. Higher calcination temperatures for similar time periods result in degradation of the catalyst activity.

The catalysts and process of the present invention may be employed under batch, or more preferably, under continuous flow conditions. In a continuous flow configuration, a catalyst bed is placed in a tubular reactor and preheated with helium or an acceptable gaseous substitute prior to contacting the catalyst bed with the nitrogen oxide-containing feed gas. The feed gas is then flowed through the air catalyst bed. The feed gas can contain diluents, e.g. He, $N_2$, or a mixture of diluents in $O_2$ as a carrier gas. The contacting zone, i.e., the catalyst bed and feed in contact with the bed, is maintained at a temperature between about 400° C. and about 800° C. for the basic metal supported catalysts, and between about 450° C. and 850° C. for the hydrotalcite-like catalysts, and preferably between about 500° C. and about 700° C. for both types of catalysts throughout the reaction.

The following examples are illustrative of the invention and should not be construed as limiting the scope of the invention or claims thereof.

Materials

Nitrous oxide 99% purity (Aldrich), helium and oxygen 99.9% purity (Matheson) were used. Silica Gel, 100–200 mesh (350 m²/g) was obtained from Fisher. Magnesium oxide #712A-4-332-1 (Engelhard) and all metal nitrates, 99% purity, (Aldrich) were used. Sodium hydroxide pellets (98.3% purity), sodium carbonate anhydrous (99.9% purity) and $NH_4OH$-28% aqueous solution were obtained from Fisher.

Catalyst Preparation

The silica supported control catalysts were prepared by impregnating the silica support with nitrates of the appropriate metals followed by drying the sample in a vacuum at 180° C. overnight. Unless otherwise indicated, the nitrate is decomposed to the oxide in the reactor under a helium flow at 500° C. overnight prior to the catalytic run. These catalysts were prepared and used merely for comparison to the catalysts of the present invention.

A CoO/XMgO catalyst wherein x=1, 2, 5 or 10 was prepared from the nitrate salts. A 20% solution of the nitrates of both metals in water was precipitated using a 20% solution of $NH_4OH$ until the pH was about 7. Then, the coprecipitated hydroxides were washed with distilled water. The solid was dried in vacuum at 100° C. overnight and calcined at 500° C. in He for 6 hours.

In the same manner, other binary oxide catalysts were prepared (MnO/2MgO, CuO/2MgO, CoO/2CaO and 3NiO/5MgO) using $NH_4OH$ solution to precipitate the hydrous oxides.

A CoO/2MgO catalyst was synthesized as follows using NaOH to precipitate the hydroxides: A 0.5–1, 3-neck round bottom flask equipped with a thermometer, reflux condenser, and a magnetic stirrer was charged with 200 ml of deionized water and 8.4 g of NaOH pellets (0.21 mole). A second solution containing 10.1868 g of Co(NO$_3$)$_2$.6H$_2$O (0.035 mole) and 17.9487 g of Mg(NO$_3$)$_2$.6H$_2$O (0.07 mole) in 170 ml of deionized water was prepared and added dropwise to the first solution while stirring over a period of about 1 hour. At this point, the pH of the mixture was about 10. A few drops of HNO$_3$ were added to reduce the pH to about 9. After addition was completed, the gelatinous mixture was filtered, washed repeatedly with water and dried overnight under vacuum at 70° C. CoO/MgO samples with 1/1, 1/5, or 1/10 ratios were synthesized using NaOH to precipitate the hydroxides in the same manner. For the CoO/MgO sample, 0.14 mole of NaOH, 0.035 mole of cobalt nitrate and 0.035 mole of magnesium nitrate were used. To obtain CoO/5MgO, 0.24 mole NaOH, 0.1 mole magnesium nitrate and 0.02 mole cobalt nitrate were used. For CoO/10MgO, 0.22 mole NaOH, 0.01 mole cobalt nitrate and 0.1 mole magnesium nitrate were used.

A Co$_3$Mg$_5$Al$_2$(OH)$_{20}$CO$_3$.yH$_2$O "hydrotalcite-like" composition was prepared as follows: A 0.5–1, 3 neck round bottom flask equipped with a thermometer, reflux condenser, and a magnetic stirrer was charged with 200 ml deionized water, 2.65 g of Na$_2$CO$_3$ (0.025 mole) and 9.0 g of NaOH pellets (0.225 mole). A second solution containing 10.915 g Co(NO$_3$)$_2$.6H$_2$O (0.0375 mole), 16.026 g Mg(NO$_3$)$_2$.6H$_2$O (0.0625 mole), 9.3778 g Al(NO$_3$)$_3$9H$_2$O (0.025 mole), and 187.5 ml deionized water was prepared and added dropwise to the first solution with stirring over 1 hour. After addition was complete, the gelatinous mixture (pH ~8.2) was heated for 15 h at 80°–85° C. The cooled mixture was then filtered, washed repeatedly with deionized water and dried overnight under vacuum at 70° C. A crushed sample was divided into two parts. The first part was calcined at 500° C. overnight in N$_2$ just before the reaction. The second part was calcined at 800° C. in N$_2$ for 8 hours.

A CO$_4$Mg$_4$Al$_2$(OH)$_{20}$CO$_3$.yH$_2$O sample was prepared according to the same procedure, except that 0.05 moles of CO(NO$_3$)$_2$.6H$_2$O and 0.05 moles of Mg(NO$_3$)$_2$.6H$_2$O were used.

Samples of Mn$_3$Mg$_5$Al$_2$(OH)$_{20}$CO$_3$.yH$_2$O, Cu$_3$.Mg$_5$Al$_2$(OH)$_{20}$CO$_3$.yH$_2$O and Ni$_3$Mg$_5$Al$_2$(OH)$_{20}$ CO$_3$.yH$_2$O were prepared according to the procedure described above for Co$_3$Mg$_5$Al$_2$(OH)$_{20}$CO$_3$.yH$_2$O using 0.0375 mole of manganese, copper and nickel nitrates, respectively.

Co$_3$Ca$_5$Al$_2$(OH)$_{20}$CO$_3$.yH$_2$O was made according to the same procedure as Co$_3$Mg$_5$Al$_2$(OH)$_{20}$CO$_3$.yH$_2$O, but using 0.0625 mole of Ca(NO$_3$)$_2$.4H$_2$O instead of the same amount of magnesium nitrate.

Magnesium oxide (Engelhard) supported catalysts were prepared by crushing 3 mm MgO pellets to a powder, adding a metal nitrate solution to the crushed support to incipient wetness and then drying the sample in a vacuum at 180° C. overnight.

Catalytic Runs

All reactions were carried out in a tubular glass reactor (i.d. 10 mm or 4 mm) using either 1.0, 0.1 or 0.05 g of catalyst. Unless otherwise indicated, all catalysts were heated at 500° C. in flowing helium overnight prior to reaction. Helium or 2–5% O$_2$ in He were used as a carrier gas at a flow rate of 8–45 ml/min through the catalyst bed. This flow rate provides a GHSV between 600–45,000 h$^{-1}$. The temperature was monitored via a thermocouple in contact with the catalyst. 2–38 vol. % of N$_2$O in the pregas was fed into the reactor using a calibrated flow meter. The reaction was carried out in the temperature range of 400°–600° C.

Method of Analysis

Products and substrates were analyzed chromatographically using a TCD detector and a 10 m column packed with Hayesep DB. Separation of N$_2$, O$_2$ and N$_2$O was achieved using helium as the carrier gas at a flow rate of 15 ml/min with temperature ramping from 40° to 100° C. at 20° C./min. The amount of nitrous oxide decomposed was calculated from the difference between the amounts in feed and in the reactor effluent.

EXAMPLE 1

Metal Oxides on Silica

In order to demonstrate the superior nitrogen conversion of the mixed oxide catalysts of the present invention, comparison control catalysts were prepared using silica gel supports.

Experiments were conducted with Fe$_2$O$_3$, CuO, CoO and CoO/MgO supported on silica (Fisher) in the amount of 5 or 10 wt. % to determine catalytic efficiency for the decomposition of nitrous oxide to oxygen and nitrogen. Silica gel modified with a small amount (max to 10 wt. %) of the various metal oxides were employed as catalysts for the reaction. The silica supported catalysts were prepared by pore filling the silica support with nitrates of an appropriate metal followed by drying the sample in vacuum oven at 180° C. overnight. The nitrate was decomposed in the reactor under a helium flow at 500° C. overnight. The reactions employed 1.0 or 0.1 g of catalyst, 2–10 vol. % N$_2$O in the reaction stream, a total flow rate of 12–40 ml/min. with temperatures between 400°–500° C. In some runs 2–5 vol. % of O$_2$ was present in the feed.

The results obtained are summarized in Table 1. The samples containing CuO or CoO show fair activity at 400° C., with a relatively high N$_2$O concentration in the feed. At 500° C., the decomposition of N$_2$O exceeds 90% for the cobalt oxide containing samples. Fe$_2$O$_3$ supported on silica shows only a slight activity at 500° C. and is inactive at lower temperatures.

TABLE 1

| | | Silica Doped Catalysts | | | |
|---|---|---|---|---|---|
| Catalyst (wt. %) | Temperature (°C.) | GHSV (h$^{-1}$) | N$_2$O Concentration in feed (ppm) | N$_2$O decomposed (%) | Reaction* Time (h) |
| Silica Gel + 5% Fe$_2$O$_3$ | 500 | 800 | 60,000 | 12 | 70 |
| Silica Gel + 5% CuO | 400 | 900 | 100,000 | 6 | 24 (94) |
| | 450 | 900 | 100,000 | 19 | 24 (118) |
| | 500 | 900 | 100,000 | 53 | 7 (125) |

TABLE 1-continued

Silica Doped Catalysts

| Catalyst (wt. %) | Temperature (°C.) | GHSV ($h^{-1}$) | $N_2O$ Concentration in feed (ppm) | $N_2O$ decomposed (%) | Reaction* Time (h) |
|---|---|---|---|---|---|
| Silica Gel + 5% CoO | 400 | 900 | 50,000 | 20 | 24 |
|  | 450 | 900 | 50,000 | 60 | 6 (30) |
|  | 500 | 900 | 50,000 | 91 | 50 (80) |
|  | 500 | 600 | 50,000 | 90 | 50 (130) |
|  |  |  |  |  | ~5% $O_2$ in feed |
| Silica Gel + 10% CuO | 500 | 900 | 90,000 | 67 | 8 |
|  | 500 | 900 | 20,000 | 47 | 92 (100) |
|  | 500 | 900 | 20,000 | 39 | 20 (120) |
|  |  |  |  |  | ~2% $O_2$ in feed |
| Silica Gel + 10% CoO | 500 | 1,000–1,500 | 50,000 | 95 | 100 |
|  | 500 | 1,000–1,500 | 50,000 | 94 | 50 (150) |
|  | 500 | 1,000–1,500 | 50,000 | 95 | 70 (220) |
|  |  |  |  |  | ~2% $O_2$ in feed |
|  | 500 | 9,000–20,000 | 50,000 | 60 | ~2% of $O_2$ in feed |
| Silica Gel + 5% CoO + | 450 | 10,000 | 60,000 | 7.6 | 7 |
| 10% MgO | 500 | 10,000 | 60,000 | 18 | 20 (27) |
| Silica Gel + 10% CoO | 500 | 20,000 | 50,000 | 60 | 100 |

*Time given is the hours on stream at indicated conditions. Total hours on stream is given in parenthesis.

The presence of 2.5% $O_2$ in feed for the cobalt oxide containing samples does not alter the catalytic activity for $N_2O$ decomposition. A disadvantage of the silica supported catalysts is reflected in the behavior at higher flow rates (GHSV=10,000 $h^{-1}$ or more). Under these conditions the best results were obtained with silica supported CoO catalyst which resulted in only 60% decomposition of a 60,000 ppm $N_2O$ feed.

EXAMPLE 2

CoO Alkaline Earth Oxide Supports

The activity of CoO supported silica for $N_2O$ decomposition prompted study of other supports. Binary CoO/xMgO catalysts were synthesized from the metal nitrates by coprecipitation of the metal hydroxides from aqueous solution with $NH_4OH$ or NaOH. Catalysts containing CoO/xMgO ratios with x=1, 2, 5 or 10 were studied. The results are compiled in Table 2. These catalysts were studied at 400–600° C., with 0.05 or 0.1 g of catalyst, 10–38 vol. % of $N_2O$ in the feed, and a total flow of 10–45 ml/min giving GHSV's of 5,000–45,000 $h^{-1}$.

All the CoO/xMgO samples are extremely active for decomposition of $N_2O$ to $N_2$ and $O_2$. No difference is observed in the activity of samples prepared using $NH_4OH$ or NaOH. At 550° C. the decomposition of nitrous oxide is greater than 99% for all the cobalt catalysts. The CoO/10MgO gave 93% decomposition with 100,000 ppm of $N_2O$ in feed at a GHSV of 35,000 $h^{-1}$. Decreasing the GHSV to 12,000 $h^{-1}$ and increasing the concentration of nitrous oxide in the feed to (380,000 ppm) resulted in 96% $N_2O$ decomposition with the 10% CoO catalyst.

TABLE 2

CoO MgO Catalysts

| Catalyst | Temperature (°C.) | GHSV ($h^{-1}$) | $N_2O$ Concentration in feed (ppm) | $N_2O$ decomposed (%) | Reaction Time (h)* |
|---|---|---|---|---|---|
| CoO/2MgO ($NH_4OH$) | 500 | 10,000–20,000 | 100,000–200,000 | 97–99 | 170 |
|  | 550 | 10,000–20,000 | 300,000 | 99.99 | 20 (190) |
|  | 400 | 10,000 | 100,000 | 74 | 20 (210) |
| CoO/2MgO ($NH_2OH$) | 500 | 10,000 | 100,000 | 50 | 20 |
| heated at 800° C. | 600 | 11,500 | 100,000 | 96 | 30 (50) |

TABLE 2-continued

CoO MgO Catalysts

| Catalyst | Temperature (°C.) | GHSV (h$^{-1}$) | N$_2$O Concentration in feed (ppm) | N$_2$O decomposed (%) | Reaction Time (h)* |
|---|---|---|---|---|---|
| CoO/2MgO (NaOH) | 500 | 5,000 | 200,000 | 99 | 20 |
|  | 550 | 6,000 | 200,000 | 100 | 10 (30) |
| CoO/MgO (NaOH) | 500 | 5,000 | 200,000 | 99.9 | 20 |
|  | 550 | 6,000 | 200,000 | 100 | 10 (30) |
| CoO/5MgO (NH$_4$OH) | 500 | 40,000 | 100,000 | 95 | 25 |
|  | 550 | 45,000 | 100,000 | >99 | 6 (31) |
| CoO/10MgO (NH$_4$OH) | 500 | 40,000 | 100,000 | 95 | 20 |
|  | 550 | 40,000 | 100,000 | >99 | 10 (30) |
| CoO/5MgO (NaOH) | 500 | 8,000 | 300,000 | 94 | 25 |
|  | 550 | 8,000 | 300,000 | >99 | 6 (31) |
| CoO/10MgO (NaOH) | 500 | 30,000 | 100,000 | 63 | 3 |
|  | 550 | 35,000 | 100,000 | 93 | 4 (7) |
|  | 550 | 12,000 | 380,000 | 96 | 23 (30) |

*Time given is the hours on stream at indicated conditions. Total hours on stream is given in parenthesis.

The stability of the CoO/2MgO catalysts with respect to sintering and its influence on activity was studied by subjecting this catalyst in a stream of flowing nitrogen to 800° C. for 8 hours. When the catalytic decomposition was carried out at 500° C. with this catalyst, an approximate 50% decomposition of N$_2$O was observed; however, by increasing the temperature to 600° C., 96% N$_2$O decomposition resulted. Long term stability to sintering is expected based on this result. The data compiled in Table 2 show that even with a very high concentration of N$_2$O in the feed, conditions can be found for very efficient decomposition of N$_2$O to gaseous oxygen and gaseous nitrogen. High activity is maintained for at least 200 hours, at which time the reaction was stopped with the catalyst still showing initial activity.

EXAMPLE 3

Hydrotalcite-like Supports

Experiments were conducted to introduce the highly active CoO/MgO system demonstrated in Example 2 into a hydrotalcite-like material. Hydrotalcite-like compounds are reported (Bhattacharyya and Kaminsky, 1994) to be unusually resistant to sintering. Hydrotalcite-like compounds have the general formula:

$[M^{2+}_{(1-x)}M_x^{3+}(OH)_2]^{x+} \cdot (A_{x/n}^{n-}) \cdot mH_2O$ wherein x usually is a number between 0.1 and 0.5, $M^{2+}$ is a divalent metal ion for example $Co^{2+}$, $Mg^{2+}$, $Cu^{2+}$, $Mn^{2+}$ and $M^{3+}$ is a trivalent metal ion, for example $Al^{3+}$. The, $A^{n-}$, can be one of a number of anions such as carbonate. We synthesized hydrotalcite like compounds with the chemical composition:

$[Co_x Mg_y Al_2 (OH)_{20} CO_3 \cdot yH_2O]$ where x=3, y=5 and x=4, y=4; $[Mn_3Mg_5Al_2(OH)_{20}CO_3 \cdot yH_2O]$; $[Cu_3Mg_5Al_2(OH)_{20}CO_3 \cdot yH_2O]$ and $[Co_3Ca_5Al_2(OH)_{20}CO_3 \cdot yH_2O]$.

The behavior of these materials as catalysts is described in Table 3. The reactions employed 0.1 g of catalyst, 10–32 vol. % N$_2$O in feed, a total flow rate of 8–30 ml/min (GHSV=4,000–15,000 h$^{-1}$) and temperatures in the range of 500–550° C. Like the CoO/XMgO catalysts, the hydrotalcite-like compounds containing Co and Mg ions are also extremely active for the decomposition of N$_2$O to O$_2$ and N$_2$. They maintain this excellent activity with a wide range of GHSV's (4,000–15,000 h$^{-1}$) and with very high concentrations on nitrous oxide in the feed (10–32 vol. %), for periods of time exceeding 100 hours. No signs of catalyst deactivation were shown.

The effect of high temperatures on the catalytic activity of a Co$_3$Mg$_5$Al$_2$(OH)$_{20}$·CO$_3$·yH$_2$O sample was studied by calcining the sample at 800° C. for 8 hours in a stream of nitrogen before the reaction. The activity during the first 4 hours of reaction at 500° C. decreased to 65% compared to 97% for the same sample calcined at 500° C. However, when the reaction temperature was increased to 550° C., the sample calcined at 800° C. for 8 hours gave nearly 100% decomposition for the next 36 hours with concentrations of N$_2$O in the feed between 15–32 vol. %. When the temperature was again decreased to 500° C., surprisingly 98% decomposition of nitrous oxide occurred for the next 80 hours. This catalyst showed no signs of deactivation, even after calcination at 800° C.

TABLE 3

Hydrotalcite Like Structure Catalyst

| Catalyst | Temperature (°C.) | GHSV (h$^{-1}$) | N$_2$O Concentration in feed (ppm) | N$_2$O decomposed (%) | Reaction* Time (h) |
|---|---|---|---|---|---|
| Co$_3$Mg$_5$Al$_2$(OH)$_{20}$CO$_3$ | 500 | 8,500 | 100,000 | 97 | 20 |
| yH$_2$O | 550 | 5,000–11,000 | 100,000–250,000 | 99–99.9 | 50 (70) |
| Co$_3$Mg$_5$Al$_2$(OH)$_{20}$CO$_3$ | 500 | 9,000 | 150,000 | 65 | 4 |
| yH$_2$O— | 550 | 6,000 | 320,000 | 100 | 16 (20) |
| calcined at 800° C. | 550 | 9,000 | 200,000 | 99.99 | 20 (40) |
|  | 500 | 6,000 | 250,000 | 98 | 80 (120) |
| Co$_4$Mg$_4$Al$_2$(OH)$_{20}$CO$_3$ | 500 | 5,000 | 250,000 | 98 | 10 |
| yH$_2$O | 550 | 5,000 | 250,000 | >99 | 15 (25) |
|  | 500 | 14,000 | 100,000 | 82 | 25 (50) |
|  | 550 | 5,000 | 350,000 | >99 | 50 (100) |
| Mn$_3$Mg$_5$Al$_2$(OH)$_{20}$CO$_3$ | 500 | 4,000 | 150,000 | 72 | 2 |

TABLE 3-continued

Hydrotalcite Like Structure Catalyst

| Catalyst | Temperature (°C.) | GHSV (h$^{-1}$) | N$_2$O Concentration in feed (ppm) | N$_2$O decomposed (%) | Reaction* Time (h) |
|---|---|---|---|---|---|
| γH$_2$O | 500 | 8,000 | 150,000 | 53 | 6 (8) |
|  | 550 | 8,000 | 150,000 | 81 | 5 (13) |
| Cu$_3$Mg$_5$Al$_2$(OH)$_{20}$CO$_3$ | 500 | 5,000 | 170,000 | 79 | 5 |
| γH$_2$O | 550 | 9,000 | 200,000 | 90 | 20 (25) |
|  | 550 | 6,000 | 160,000 | 95 | 25 (50) |
| Co$_3$Ca$_5$Al$_2$(OH)$_{20}$CO$_3$ | 500 | 11,000 | 120,000 | 36 | 3 |
| γH$_2$O | 500 | 6,000 | 250,000 | 47 | 3 (6) |
|  | 550 | 6,000 | 250,000 | 90 | 3 (9) |
|  | 550 | 8,000 | 150,000 | 96 | 16 (25) |
|  | 550 | 15,000 | 120,000 | 93 | 15 (40) |
|  | 550 | 7,000 | 250,000 | 95 | 5 (45) |
| Ni$_3$Mg$_5$Al$_2$(OH)$_{20}$CO$_3$ | 515 | 24,000 | 240,000 | 42 | 3 |
| γH$_2$O | 550 | 25,000 | 250,000 | 48 | 11 (14) |
|  | 550 | 52,500 | 170,000 | 26 | 30 (44) |

*Time given is the hours on stream at indicated conditions. Total hours on stream is given in parenthesis.

EXAMPLE 4

Other Binary Oxide Combinations

Catalysts comprised of the following oxides (MnO, CuO, NiO and CoO) in the form of binary oxides with MgO or CaO were prepared. The reaction conditions are similar to those described in Examples 2 and 3 and are given together with the catalytic results in Table 4.

At the conditions studied for N$_2$O decomposition, the most active of the catalysts in Table 4 were CuO/2MgO, CoO/2CaO and 3NiO/5MgO samples. The MnO/2MgO sample showed much lower activity.

A commercial sample of MgO catalyst support pellets was obtained from Engelhard and several catalysts were prepared with cobalt oxide amounts in the range of 1–10 wt. % and one with copper oxide at 5 wt. %. The reaction conditions were similar to those described for the earlier runs and they along with the results obtained are compiled in Table 5. Samples containing 1 or 5 wt. % of transition metal oxide showed only low activity for N$_2$O decomposition especially at 500° C. The sample prepared by doping MgO with 10% CoO gave activity comparable to the best results reported for the co-precipitated CoO/MgO catalysts.

TABLE 4

Other Binary Oxide Catalysts

| Catalyst (wt. %) | Temperature (°C.) | GHSV (h$^{-1}$) | N$_2$O Concentration in feed (ppm) | N$_2$O decomposed (%) | Reaction* Time (h) |
|---|---|---|---|---|---|
| MnO/2MgO (NH$_4$OH) | 500 | 8,500 | 150,000 | 15 | 4 |
|  | 500 | 6,500 | 150,000 | 12 | 4 (8) |
|  | 550 | 6,000 | 150,000 | 40 | 24 (32) |
| CuO/2MgO (NH$_4$OH) | 500 | 10,000 | 150,000 | 75 | 10 |
|  | 550 | 13,000 | 200,000 | 94 | 15 (25) |
|  | 550 | 6,000 | 280,000 | 97 | 6 (31) |
| CoO/2CaO (NH$_4$OH) | 500 | 15,000 | 150,000 | 95 | 6 |
|  | 550 | 17,000 | 150,000 | 96 | 25 (31) |
| 3NiO/5MgO (NH$_4$OH) | 500 | 11,500 | 160,000 | 100 | 1 |
|  | 510 | 45,000 | 50,000 | 94 | 2 (3) |
|  | 570 | 48,000 | 145,000 | 97 | 7 (10) |
|  | 550 | 13,000 | 220,000 | 97 | 18 (28) |
|  | 500 | 12,500 | 220,000 | 68 | 3 (31) |

*Time given is the hours on stream at indicated conditions. Total hours on stream is given in parenthesis.

TABLE 5

Metal Oxide Catalysts Based on MgO Support (Engelhard #712A-4-332-1)

| Catalyst (wt. %) | Temperature (°C.) | GHSV (h$^{-1}$) | N$_2$O Concentration in feed (ppm) | N$_2$O decomposed (%) | Reaction Time (h)* |
|---|---|---|---|---|---|
| MgO + 1% Co | 500 | 5,000 | 240,000 | 24 | 4 |
|  | 550 | 5,000 | 300,000 | 44 | 20 (24) |
| MgO + 5% CoO | 500 | 5,000 | 200,000 | 28 | 3 |
|  | 550 | 5,000 | 200,000 | 58 | 4 (7) |
| MgO + 10% CoO | 500 | 6,000 | 175,000 | 87 | 4 |
|  | 550 | 6,000 | 175,000 | >99 | 4 (8) |
|  | 550 | 15,000 | 200,000 | 89 | 16 (24) |

TABLE 5-continued

Metal Oxide Catalysts Based on MgO Support (Engelhard #712A-4-332-1)

| Catalyst (wt. %) | Temperature (°C.) | GHSV (h$^{-1}$) | N$_2$O Concentration in feed (ppm) | N$_2$O decomposed (%) | Reaction Time (h)* |
|---|---|---|---|---|---|
|  | 550 | 5,000 | 300,000 | 99 | 8 (32) |
| MgO + 5% CuO | 500 | 5,500 | 200,000 | 0 | 4 |
|  | 550 | 5,500 | 200,000 | 46 | 4 (8) |

*Time given is the hours on stream at indicated conditions. Total hours on stream is given in parenthesis.

EXAMPLE 5

A CoO/2MgO molar ratio=(1:2) catalyst was prepared from the nitrate salts. A 20% solution of the nitrates of both metals in water was precipitated by adding a 20% solution of NH$_4$OH until a pH of about 7 was reached. Then, the coprecipitated hydroxides were washed with distilled water. The solid was dried in an oven at 100° C. overnight and calcined at 550° C. in N$_2$ for 6 hours. The catalyst was placed in the reactor, heated in He at 500° C. overnight. The reaction was carried out in the temperature range of 400°–500° C. with 0.1 g of catalyst, an N$_2$O feed of ~100,000 ppm and a GHSV of 10,000–20,000 h$^{-1}$. At 500° C., 97–99% N$_2$O was decomposed to N$_2$ and O$_2$. At 450° C., the conversion dropped to about 74% and at 400° C., to about 52%. When the temperature was increased back to 500° C., conversion of N$_2$O reached the earlier level of about 98% for the next 170 hours that the reaction was carried out.

EXAMPLE 6

This run is a repeat of Example 5, except a slightly higher temperature was used. The preparation and activation of the catalyst was the same as in Example 5. With 100,000 ppm of N$_2$O in feed and GHSV at 10,000 h$^{-1}$ at 500° C., 97% of the N$_2$O was decomposed. At 550° C., with 30 vol. % of N$_2$O in feed, more than 99% was decomposed.

EXAMPLE 7

The methods of Examples 5 and 6 were repeated but the sample was calcined at 800° C. for 8 hours in N$_2$ just before the reaction. The N$_2$O feed was ~100,000 ppm and GHSV ~10,000 h$^{-1}$. At 500° C., the conversion of N$_2$O to N$_2$ and O$_2$ was approximately 50%, reaching the level of approximately 96% at 600° C.

EXAMPLE 8

A CoO/MgO "hydrotalcite like" catalyst was prepared for this example. A 0.5–1, 3 neck round bottom flask equipped with a thermometer, reflux condenser, and a magnetic stirrer was charged with 200 mL deionized water, 2.65 g of Na$_2$CO$_3$ (0.025 mole) and 9.0 g of NaOH pellets (0.225 mole). A second solution containing 11.642 g of Co(NO$_3$)$_2$.6H$_2$O (0.04 mole) and 15.3846 g Mg(NO$_3$)$_2$.6H$_2$O (0.06 mole) and 9.3783 g Al(NO$_3$)$_3$.9H$_2$O (0.025 mole) and 187.5 ml deionized water was prepared and added dropwise to the first solution while stirring for a period of about 1 hour. After addition was complete, the gelatinous mixture (pH ~8.2) was heated for 15 hours at 80°–85° C. The cooled mixture was then filtered, washed repeatedly with deionized water and dried overnight under vacuum at 70° C. After drying the freshly prepared catalyst at 70° C. in a vacuum oven overnight, the expected formulation is: Co$_{3.2}$, Mg$_{4.8}$, Al$_2$ (OH)$_{20}$CO$_3$.yH$_2$O. A crushed sample was calcined at 500° C. overnight just before the reaction. These catalysts are known to be resistant to sintering even at 900° C. The N$_2$O feed was approximately 100,000 ppm with a GHSV between 5,000–11,000 h$^{-1}$. At 500° C., with the higher GHSV, 95% of the N$_2$O was decomposed, while at lower GHSV 98% decomposition resulted. At 500° C., the N$_2$O conversion for 70 hrs exceeded 99.8% at a GHSV of 11,000 h$^{-1}$, and was higher than 99.9% when a GHSV of 5,000 h$^{-1}$ was employed.

EXAMPLE 9

The method of Example 8 was repeated, but the catalyst was calcined at 800° C. for 8 hours in N$_2$ just before the reaction. The N$_2$O feed was at least 100,000 ppm, and as high as about 30% vol. The GHSV was between 5,000–13,500 h$^{-1}$. For the first 5 hours at 500° C., N$_2$O conversion was approximately 65% and after increasing the temperature to 550° C. it exceeded 99%. At lower GHSV (about 6,000 h$^{-1}$) approximately 300,000 ppm of N$_2$O was completely decomposed to N$_2$ and O$_2$. After 40 hrs of reaction at 550° C., the temperature was decreased to 500° C. For the next 70 hrs, 98% decomposition resulted with approximately 200,000 ppm of N$_2$O in feed and a GHSV of about 6,000 h$^{-1}$.

EXAMPLE 10

This catalyst was prepared by the method of Example 8 except that the amount of Co(NO$_3$)$_2$.6H$_2$O used was 0.05 moles instead of 0.04 moles and of Mg(NO$_3$)$_2$.6H$_2$O also 0.05 moles instead of 0.06 moles. Therefore, the ratio of Co:Mg is 1:1 in the prepared sample which after drying is expected to have the formulation of Co$_4$Mg$_4$Al$_2$(OH)$_{20}$CO$_3$.yH$_2$O. A 0.1 g sample was taken for the reaction. Just before the reaction it was calcined at 500° C. in N$_2$ overnight. N$_2$O ranged from 100,000–300,000 ppm and the GHSV was in the range 5,000–15,000 h$^{-1}$. At 500° C. the lower GHSV (5,000 h$^{-1}$) gave 98% decomposition even when the feed contained nearly 30 vol. % N$_2$O. At a GHSV of 15,000 h$^{-1}$, 80% decomposition was obtained with 10 vol. % of N$_2$O in feed at 500° C. Complete decomposition to N$_2$ and O$_3$ resulted at 550° C., a GHSV of 5,000 h$^{-1}$ and a feed of 30 vol. % of N$_2$O. The catalyst did not show any signs of deactivation after 105 hrs at which time the reaction was stopped.

EXAMPLE 11

A CoO/2MgO (molar ratio=1:2) catalyst was prepared by coprecipitation from nitrates using NaOH. The catalyst was prepared as follows: A 0.5–1, 3-neck round bottom flask equipped with a thermometer, reflux condenser, and a magnetic stirrer was charged with 200 mL deionized water and 8.4 g of NaOH pellets (0.21 mole). A second solution containing 10.1868 g of Co(NO$_3$)$_2$.6H$_2$O (0.035 mole) and 17.9487 g of Mg(NO$_3$)$_2$.6H$_2$O (0.07 mole) and 170 ml of deionized water was prepared and added dropwise to the first solution while stirring for a period of about 1 hr. At this point, the pH of the mixture was about 10. A few drops of HNO$_3$ were added to reduce the pH to about 9. After addition was complete, the gelatinous mixture was heated for about 15 hrs at 80°–85° C. The cooled mixture was filtered, washed repeatedly with water and dried overnight under vacuum at 70° C. A crushed sample was calcined at 500° C. in the reaction tube overnight under a He flow. The reaction was started with an N$_2$O feed of approximately 200,000 ppm and a GHSV of 5,000–6,000 h$^{-1}$. At 500° C., for the first 25 hrs, N$_2$O conversion exceeded 99% and at 550° C., 100% decomposition was observed for an additional 5 hrs.

EXAMPLE 12

The sample for this run was prepared in the same way as in Example 11 except that the amount of Mg(NO$_3$)$_2$.6H$_2$O used was 0.035 moles and the amount of NaOH was 0.14 moles. The molar ratio of CoO:MgO is 1:1. The conditions in Example 11 were repeated with this catalyst. At 500° C., the N$_2$O conversion was higher than 99.9%, reaching the level of 100% at 550° C. even after 30 hours of reaction.

EXAMPLE 13

CoO/5MgO (1:5 molar ratio) was prepared for this example. NH$_4$OH solution was used as the precipitating agent. It was prepared according to the method of Example 5. The N$_2$O feed was approximately 100,000 ppm. At 500° C., with a GHSV equal to 40,000 h$^{-1}$, 95% decomposition of N$_2$O to N$_2$ and O$_2$ occurred and exceeded 99% at 550° C.

EXAMPLE 14

CoO/10MgO (molar ratio=1:10) was prepared for this example. NH$_4$OH was taken as precipitating agent. It was prepared according to the sample of Example 5. The N$_2$O feed was approximately 100,000 ppm and GHSV=35,000 h$^{-1}$. At 500° C., the conversion of N$_2$O to N$_2$ and O$_2$ was about 95% and at a temperature of 550° C. exceeded 99%.

EXAMPLE 15

A 1:5 molar ratio of CoO to MgO was used for this example. NaOH was taken as the precipitating agent instead of NH$_4$OH. The catalyst was prepared according to the method of Example 11 with the exception that the amount of NaOH used was 0.24 moles, the amount of CO(NO$_3$)$_2$.6H$_2$O was 0.02 moles and the amount of Mg(NO$_3$)$_2$.6H$_2$O was 0.1 moles. The N$_2$O feed was 100,000–300,000 ppm. At 500° C., with a GHSV of 30,000 h$^{-1}$ and 10 vol. % N$_2$O, 76% of the N$_2$O was decomposed to N$_2$ and O$_2$. At 500° C., with a GHSV of 8,000 h$^{-1}$ and 30 vol. % N$_2$O in feed, 94% was decomposed. Raising the temperature to 550° C., resulted in 99% decomposition.

EXAMPLE 16

A 1:10 molar ratio of CoO to MgO was used for this example. NaOH was taken as the precipitating agent instead of NH$_4$OH. The catalyst was prepared according to the method of Example 11 with the exception that the amount of NaOH used was 0.22 moles, the amount of Co(NO$_3$)$_2$.6H$_2$O was 0.01 moles and the amount of Mg(NO$_3$)$_2$.6H$_2$O was 0.1 moles. The N$_2$O feed was 100,000–300,000 ppm. At 500° C., with a GHSV of 30,000 h$^{-1}$ and 10 vol. % N$_2$O, 63% of the N$_2$O was decomposed to N$_2$ and O$_2$. Raising the temperature to 550° C., with a GHSV of 35,000 h$^{-1}$ and 10 vol. % N$_2$O in the feed resulted in 93% decomposition. At 550° C., a GHSV of 12,000 h$^{-1}$, and with 38 vol. % N$_2$O in the feed, 96% decomposition resulted.

EXAMPLE 17

A MgO support (Engelhard #712A-4-332-1) was ground to a coarse powder and pore filled with an aqueous solution of the required amount of Co(NO$_3$)$_2$.6H$_2$O to give a sample containing 5 wt. % CoO. The solid was dried in vacuum at 180° C. overnight and calcined in a stream of N$_2$ for 6 hours at 500° C. A 0.1 g sample prepared in this way was taken for the catalytic run. N$_2$O decomposition was carried out in a stream of He with an N$_2$O feed of approximately 200,000 ppm and a GHSV of 5,200 h$^{-1}$. At 500° C. for 3 hours of reaction, 28% of the N$_2$O was decomposed to N$_2$ and O$_2$. During the next 4 hours at 500° C., 58% of the N$_2$O was decomposed.

EXAMPLE 18

The MgO support of Example 17 was pore filled with an aqueous solution of Cu(NO$_3$)$_2$.2½H$_2$O instead of cobalt nitrate. Otherwise, the sample was prepared in the same manner and contained 5 wt. % CuO. An N$_2$O feed of 200,000 ppm in helium carrier gas and a GHSV of 5,500 h$^{-1}$ were used. During 4 hours at 500° C., 0.1% N$_2$O was decomposed. On raising the temperature to 550° C., 46% of the N$_2$O was decomposed during the next four hours.

EXAMPLE 19

A 10 wt. % CoO sample was prepared according to the procedure of Example 17. The conditions of Example 17 were used in the catalytic run. During the first 4 hours at 500° C. (N$_2$O feed=175,000 ppm; GHSV=6,000 h$^{-1}$), 87% of the N$_2$O was decomposed. During the next 4 hours at 550° C., 99.9% of the nitrous oxide was decomposed. During the next 16 hours, the N$_2$O feed was increased to 195,000 ppm and the GHSV was increased to 15,000 h$^{-1}$. At 550° C., the N$_2$O decomposition decreased to about 89%. During the next 8 hours at the same temperature, the N$_2$O feed was increased to 350,000 ppm, but the GHSV was decreased to 5,200 h$^{-1}$ resulting in 99% decomposition of N$_2$O.

EXAMPLE 20

The MgO support in Example 17 was doped with 1 wt. % of CoO according to the procedure of Example 17. With an N$_2$O feed of 240,000 ppm and a GHSV of 5,000 h$^{-1}$, 24% of the nitrous oxide was decomposed to N$_2$ and O$_2$ at 500° C. At 550° C. with an N$_2$O feed of 300,000 ppm and the same GHSV, 44% of the N$_2$O was decomposed.

EXAMPLE 21

A CuO/2MgO (molar ratio 1:2) catalyst was prepared from the nitrate salts. 8.14 g of Cu(NO$_3$)$_2$.2½ H$_2$O (0.035 mole) and 17.95 g of Mg(NO$_3$)$_2$.6H$_2$O (0.070 mole) were dissolved in approximately 100 mL of deionized water. The hydroxides were coprecipitated by adding an aqueous solution of approximately 28% NH$_4$OH dropwise to achieve a pH of about 7 (approximately 6 mL were used) over about 30 min. The whole mixture was stirred and then the coprecipitated hydroxides were washed with deionized water until no ammonia was detected in the wash. After drying in vacuum at 100° C. overnight, the solid was then crushed and calcined in Ar at 500° C. The decomposition of N$_2$O was carried out using 0.1 g of catalyst. After 10 hours of reaction at 500° C. with an N$_2$O feed of ~150,000 ppm and a GHSV of 10,000 h$^{-1}$, 75% of nitrous oxide was decomposed. For the next 15 hours at 550° C. (N$_2$O feed of 200,000 ppm; GHSV of 13,000 h$^{-1}$), 94% of the N$_2$O was decomposed.

For the next six hours at 550° C., the $N_2O$ feed was increased to 280,000 ppm but the GHSV was decreased to 6,000 $h^{-1}$. The decomposition of nitrous oxide increased to 97%.

EXAMPLE 22

A CuO/MgO "hydrotalcite like" catalyst (with a formulation $Cu_3Mg_5Al_2(OH)_{20}CO_3.yH_2O$) was prepared. A 0.5–1, 3 neck round bottom flask equipped with a thermometer, reflux condenser and magnetic stirrer was charged with 200 mL deionized water, 2.65 g of $Na_2CO_3$ (0.025 mole) and 9.0 g of NaOH pellets (0.225 mole). A second solution containing 8.72 g of Cu $(NO_3)_2.2½H_2O$ (0.0375 mole) and 16.03 g of $Mg(NO_3)_2.6H_2O$ (0.0625 mole) and 9.38 g of $Al(NO_3)_3.9H_2O$ (0.025 mole) and 187.5 mL of deionized water was prepared and added dropwise to the first solution while stirring for a period of about one hour. After addition was complete, the gelatinous mixture (pH ~8.5) was heated for about 15 hours at 80°–85° C. The cooled mixture was then filtered, washed with water until the pH reached about 7 and dried overnight in a vacuum oven at approximately 70° C. The catalyst was then calcined at 500° C. in Ar overnight. A 0.1 g of sample was taken for this run. The reaction was carried out at 550° C. for 6 hours with an $N_2O$ feed of 170,000 ppm and a GHSV of 5,000 $h^{-1}$ giving 79% decomposition. For the next 19 hours at 550° C., a 200,000 ppm $N_2O$ feed and a GHSV of 8,900 $h^{-1}$ gave approximately 90% $N_2O$ decomposition. For the next 25 hours at 550° C., the $N_2O$ feed was decreased to 160,000 ppm; the GHSV was decreased to 6,000 $h^{-1}$ and 95% of the $N_2$ was decomposed to $N_2$ and $O_2$.

EXAMPLE 23

A CoO/2CaO (molar ratio 1:2) catalyst was prepared from the nitrate salts. 10.19 g of $Co(NO_3)_2.6H_2O$ (0.035 mole) and 16.53 g of $Ca(NO_3)_2.4H_2O$ (0.070 mole) were dissolved in approximately 100 mL of deionized water. The hydroxides were coprecipitated adding an aqueous solution of approximately 28% $NH_4OH$ dropwise to achieve a pH of about 7 (approximately 12 ml was used) over about 30 min. The whole mixture was stirred and then the coprecipitated hydroxides were washed with deionized water until there was no ammonia in the filtrate. After drying in a vacuum at 100° C. overnight, the solid was crushed and calcined in Ar at 500° C. The $N_2O$ decomposition reaction was carried out using 0.1 g of the catalyst and an $N_2O$ feed of 150,000 ppm. For 6 hours at 500° C., with a GHSV of 15,000 $h^{-1}$, 95% $N_2O$ decomposition resulted. At 550° C. and a GHSV of 17,000 $h^{-1}$, 96% of the $N_2O$ was decomposed during the next 31 hours.

EXAMPLE 24

A CoO/CaO "hydrotalcite like" catalyst with a formulation $Co_3Ca_5Al_2(OH)_{20}CO_3.yH_2O$ was prepared by the method of Example 22. The first solution contained 2.65 g $Na_2CO_3$ (0.025 mole) and 9.0 g NaOH (0.225 mole) dissolved in 200 mL of distilled water. The cobalt solution contained 10.19 g of $Co(NO_3)_2.6H_2O$ (0.0375 mole) and 14.76 g of $Ca(NO_3)_2.4H_2O$ (0.0625 mole) and 9.38 g of $Al(NO_3)_3.9H_2O$ (0.025 mole) dissolved in 188 ml of deionized water. For $N_2O$ decomposition 0.1 g of the catalyst was taken. For the first 3 hours at 500° C., with an $N_2O$ feed of 120,000 ppm and a GHSV of 11,000 $h^{-1}$, 36% of the $N_2O$ was decomposed. When the GHSV was decreased to 5,800 $h^{-1}$ and the $N_2O$ feed increased to 250,000 ppm, 47% of the $N_2O$ was decomposed during the next three hours. By increasing the temperature to 550° C. ($N_2O$ feed of 250,000 ppm; GHSV of 6,200 $h^{-1}$), 90% of the nitrous oxide was decomposed during the next three hours. During the next 16 hours at 550° C., the $N_2O$ feed was decreased to 150,000 ppm and the GHSV increased to 8,200 $h^{-1}$, resulting in 96% decomposition of $N_2O$ to $N_2$ and $O_2$. For the next 15 hours the GHSV was increased to 15,000 ppm with 120,000 ppm of $N_2O$ resulting in 93% decomposition. When the GHSV was decreased to 7,200 $h^{-1}$ with 250,000 ppm of $N_2O$ in the feed, 95% of the nitrous oxide was decomposed at 550° C. during the next five hours of reaction.

EXAMPLE 25

A NiO/MgO (3:5) catalyst was prepared from the nitrate salts. A 20% solution of the nitrates of both metals in water was precipitated using a 20% solution of $NH_4OH$ until a pH of about 7 was reached. Then, the coprecipitated hydroxides were washed with distilled water. The solid was dried at 100° C. overnight and calcined at 500° C. in $N_2$ for 6 hours. A 0.1 g sample of catalyst was placed in the reactor, heated in He at 500° C. overnight. The reaction was carried out in the temperature range of 500°–570° C., with an $N_2O$ feed of 50,000–220,000 ppm and a GHSV of 11,000–48,000 $h^{-1}$. At 500° C., for the first 1 hour, with 160,000 ppm of $N_2O$ in the feed and a GHSV of 11,500 $h^{-1}$, 100% of the $N_2O$ was decomposed to nitrogen and oxygen. For the next 2 hours ($N_2O$ feed=56,000 ppm; GHSV=45,000 $h^{-1}$) the decomposition of $N_2O$ was 94%. Increasing the temperature to 570° C. with 14.5% of $N_2O$ in the feed and a GHSV of 48,000 $h^{-1}$, 97.6% decomposition resulted for the next 4 hours. At 550° C., after 28 hours of reaction with 22% $N_2O$ in the reaction stream and a GHSV of 13,000 $h^{-1}$, 97% $N_2O$ decomposition resulted. Increasing the GHSV to 30,000 $h^{-1}$ With 10% $N_2O$, 90% decomposition resulted. When the temperature was decreased back to 500° C. and after 31 hours of reaction, 68.7% of the $N_2O$ was decomposed with 22% of $N_2O$ in the feed and a GHSV of 12,500 $h^{-1}$.

Although the invention has been described by reference to preferred embodiments, it is not intended that the novel processes and compositions be limited thereby but various modifications are intended to be included as falling within the spirit and broad scope of the foregoing disclosure and the following claims.

What is claimed is:

1. A process for the decomposition of nitrogen oxides, comprising contacting a nitrogen oxide with a mixed oxide catalyst under conditions effective to decompose the nitrogen oxide to nitrogen and oxygen, wherein the catalyst comprises a first metal oxide selected from the oxide of Mn, Fe, Co, Ni, Cu, Zn, or mixtures thereof on a metal oxide support consisting essentially Of MgO, CaO, ZnO, $TiO_2$, $MoO_3$—CoO—$Al_2O_3$, ZnO—$Al_2O_3$, $TiO_2$—MgO, $Al_2O_3$—ZnO, $TiO_2$—$Al_2O_3$, $TiO_2$—ZnO, MgO—CuO and MgO—NiO or mixtures thereof, and wherein the catalyst is prepared by contacting the support with the nitrate salt of said first metal oxide, and wherein the catalyst is calcined prior to use under conditions effective to decompose to metal oxide said nitrate salt of said first metal oxide without sintering or intercalation of the catalyst.

2. The process of claim 1 wherein the catalyst is calcined at a temperature between about 500° C. and about 800° C.

3. The process of claim 1 wherein the contacting occurs at a temperature between about 400° C. and about 800° C. and at a GHSV of at least 1,000 $h^{-1}$.

4. The process of claim 2 wherein the contacting temperature is between about 500° C. and about 700° C. and at a GHSV of at least 4000 $hr^{-1}$.

5. The process of claim 3 wherein the support contains a metal oxide selected from the group consisting of MgO, CaO and mixtures thereof.

6. The process of claim 3 wherein the first metal oxide is MnO, CuO, NiO, CoO, or mixture thereof.

7. The process of claim 3 wherein the mixed oxide catalyst consists essentially of MnO, CuO, NiO, CoO, or mixture thereof in combination with MgO, CaO, or mixture thereof.

8. The process of claim 3 wherein the mixed oxide catalyst consists essentially of CuO/2MgO, 3NiO/5MgO, MnO/2MgO, CoO/2CaO, or 2MgO/CuO.

9. The process of claim 3 wherein the catalyst comprises cobalt oxide or copper oxide in an amount of from about 1 to about 10 weight percent based on the total weight of the catalyst.

10. The process of claim 1 wherein the nitrogen oxide is $N_2O$.

11. The process of claim 1 wherein the nitrogen oxide is present during contacting in a feed in a concentration of from about 1,000 to about 300,000 ppm.

12. A mixed oxide catalyst composition useful in a process for the decomposition of nitrogen oxides, wherein the composition comprises a first metal oxide selected from the oxide of Mn, Fe, Co, Ni, Cu, Zn, or mixtures thereof on a metal oxide support consisting essentially of MgO, CaO, ZnO, $TiO_2$, $MoO_3$—CoO—$Al_2O_3$, ZnO—$Al_2O_3$, $TiO_2$-MgO, $Al_2O_3$—ZnO, $TiO_2$—$Al_2O_3$, $TiO_2$—ZnO, MgO—CuO and MgO—NiO or mixtures thereof, and wherein the catalyst is prepared by contacting the support with the nitrate salt of said first metal oxide, and wherein the catalyst is calcined prior to use under conditions effective to decompose to metal oxide said nitrate salt of said first metal oxide without sintering or intercalation of the catalyst.

13. The catalyst of claim 12 wherein the catalyst is calcined at a temperature between about 500° C. and about 800° C.

14. The catalyst of claim 12 wherein the support contains a metal oxide selected from the group consisting of MgO, CaO and mixtures thereof.

15. The catalyst of claim 12 wherein the first metal oxide is MnO, CuO, NiO, CoO, or mixture thereof.

16. The catalyst of claim 12 wherein the mixed oxide catalyst consists essentially of MnO, CuO, NiO, CoO, or mixture thereof in combination with MgO, CaO, or mixture thereof.

17. The catalyst of claim 12 wherein the mixed oxide catalyst consists essentially of CuO/2MgO, 3NiO/5MgO, MnO/2MgO, CoO/2CaO, or 2MgO/CuO.

18. The catalyst of claim 12 wherein the first metal oxide is cobalt oxide or copper oxide and is present in an amount of from about 1 to about 10 weight percent.

19. The catalyst of claim 12 wherein the catalyst has a structure characterized by an x-ray photoelectric spectroscopy signature containing an oxygen 1s peak that can be resolved into three different component peaks, said peaks reflecting the presence of hydroxyl functionalities on the catalyst and the absence of spinnel or related structures.

20. A process for the decomposition of nitrogen oxides, comprising contacting a gaseous feed containing one or more nitrogen oxides with a mixed oxide catalyst under conditions effective to decompose nitrogen oxide components to nitrogen and oxygen, wherein the catalyst is selected from the group consisting of $Cu_3Mg_5Al_2(OH)_{20}CO_3 \cdot yH_2O$; $Ni_3Mg_5Al_2(OH)_{20}CO_3 \cdot yH_2O$; $Mn_3Mg_5Al_2(OH)_{20}CO_3 \cdot yH_2O$ or $Co_3Ca_5Al_2(OH)_{20}CO_3 \cdot yH_2O$ and is prepared by adding a base to an aqueous composition containing cobalt nitrate, calcium nitrate, and aluminum nitrate such that a gel forms; drying the gel; and calcining the dry gel to form the mixed metal oxide.

21. The process of claim 20 wherein said contacting is at temperatures from about 450° C. to about 850° C.

22. The process of claim 20 wherein said contacting is at temperatures from about 500° C. to about 700° C.

23. The process of claim 20 wherein the mixed metal oxide catalyst has a lifetime of at least about 120 hours in feed concentrations of nitrogen oxide up to about 250,000 ppm, and has a lifetime of at least about 100 hours in feed concentrations of nitrogen oxide up to about 350,000 ppm.

24. The process of claim 20 wherein the contacting occurs at a GHSV of at least 1000 $h^{-1}$.

25. The process of claim 20 wherein the nitrogen oxide is $N_2O$.

26. The process of claim 20 wherein feed concentration of the nitrogen oxide in the gas is about 1,000 to about 300,000 ppm.

* * * * *